Dec. 8, 1964           K. J. DRESSER           3,160,025

CONTROL MECHANISM FOR CONTROLLING GEAR TRAIN BACKLASH

Filed Nov. 28, 1962           2 Sheets-Sheet 1

Inventor,
Kenneth J. Dresser,
by Francis K. Doyle
His Attorney.

Inventor,
Kenneth J. Dresser,
by Francis K. Doyle
His Attorney.

United States Patent Office 3,160,025
Patented Dec. 8, 1964

3,160,025
CONTROL MECHANISM FOR CONTROLLING
GEAR TRAIN BACKLASH
Kenneth J. Dresser, South Berwick, Maine, assignor to
General Electric Company, a corporation of New York
Filed Nov. 28, 1962, Ser. No. 240,506
4 Claims. (Cl. 74—409)

This invention relates to gear trains and more particularly to a control mechanism for controlling gear train backlash.

As is well known to those skilled in the gear train art, it is necessary to provide tooth clearances between the teeth of the various gears to enable the operation of the gear train. As will be understood, if the teeth of one gear were formed to make a very close fit with the mating teeth of an adjacent gear the teeth would tend to lock with each other, thereby preventing the rotation of the gears. However, the tooth clearance provided between the adjacent gears results in a certain amount of play between the mating teeth; this play is generally referred to as "backlash" in the gear art. It is well known that the backlash between the gears allows one gear to be moved a small distance before the mating teeth engage and the adjacent gear begins to move. In many instances, these clearances, or backlash distances, are accumulated along a gear train. In some cases, the backlash accumulating in a gear train can result in the undesirable positioning of various gears within the gear train.

From the above it is clear that mating gears must be provided with adequate tooth clearance to enable proper operation of the gears. It is also apparent that such clearances lead to undesirable backlash between mating gears. Clearly, it is desirable to be able to provide mating gears having adequate tooth clearance with control means for controlling the undesirable backlash in their operation.

It is, therefore, one object of this invention to provide mating gears with a control means for controlling the backlash in the gear operation.

A further object of this invention is to provide a gear train having a control mechanism for controlling the backlash within the gear train.

A still further object of this invention is to provide a control mechanism for gear trains which will maintain the gears in substantial contact to eliminate backlash between the gears.

In carrying out this invention in one form, magnetic means are secured to a rotating gear meshing with at least one other gear. Second magnetic means are fixedly positioned in close proximity to the rotating gear to provide a directional torque on the rotating gear due to the interaction or coaction of the two magnetic means. The direction of the applied torque is such as to cause the rotating gear to maintain contact with at least one other gear to control the backlash between such gears.

The invention which is desired to be protected by this application will be clearly pointed out and distinctly claimed in the claims appended hereto. However, it is believed that this invention and the manner in which its objects and advantages are obtained, as well as other objects and advantages thereof, will be better understood by reference to the following detailed description thereof when taken in connection with the accompanying drawings in which:

Reference will now be made to the drawings wherein there is shown a gear train utilizing magnetic means to control backlash between the gears. As is shown, a first magnetic means is secured to one rotating gear and a second magnetic means is fixedly positioned in proximity to the rotating gear. The interaction of the first and second magnetic means provides a directional torque to the rotating gear causing the gear to remain in driving contact with another gear of the gear train. It will be understood that the term "proximity" means that the second magnetic means is sufficiently close to the gear to provide the desired magnetic interaction between the first and second magnetic means.

Figure 1:
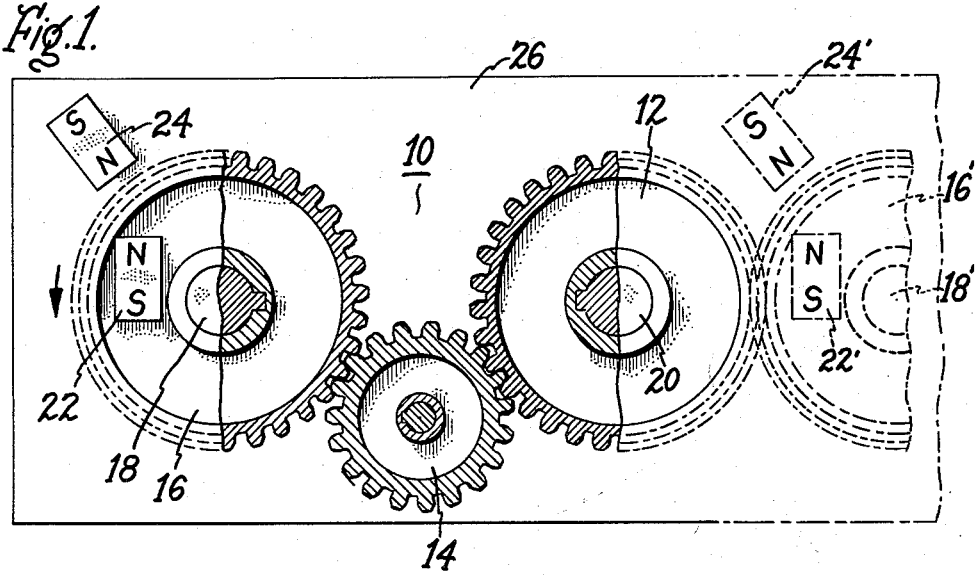
FIGURE 1 is a plan view, partly in section, of a gear train showing one form of backlash control mechanism according to this invention.
Figure 2:
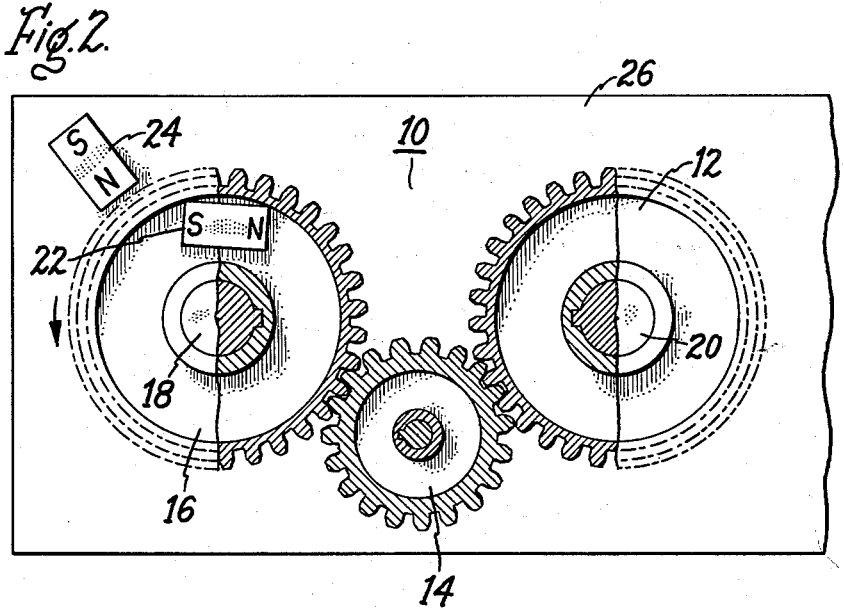
FIGURE 2 is another view of the gear train of FIG. 1, showing the gears in a second position.

Referring now to FIGS. 1 and 2 of the drawings, which show one form of the invention, a gear train 10 is shown. The gear train 10 is comprised of gears 12, 14 and 16; in which gear 12 is the driving gear, gear 14 is an idler gear, and gear 16 is a driven gear. For purposes of this disclosure, it is assumed that the gear train 10 is actuated such that gear 16 is always driven in a counterclockwise direction, as indicated by the arrow, when the gear train 10 is operating. As will be understood, gear 16 may be, for example, a gear for driving shaft 18 for positioning an indicating device (not shown). Of course, it will also be understood that gear 16 may similarly be utilized to drive other gears in the gear train in the same fashion as gear 12. Further, for purposes of gear train 10 it may be considered that gear 12 is driven by means of shaft 20, although of course, it will be understood that gear 12 could also be another gear of the gear train which is driven by a further gear to the right of gear 12. For example, the gear 16', shown in phantom lines to the right of gear 12.

Considering now the control mechanism utilized in the form of the invention shown in FIGS. 1 and 2, a magnetic means is provided, as indicated by block 22. Magnetic means 22 is a block of magnetic material having a North and South Pole, as indicated. A second magnetic means is provided, as indicated at 24. Magnetic means 24 is a block of similar magnetic material also having the North and South Poles as indicated. The magnetic means 22 is mounted on the gear 16 in a fixed position on the gear, and rotates with gear 16. The magnetic means 24 is fixedly positioned adjacent to, or in close proximity to, the gear 16. For example, by being mounted on the case or housing 26 of the gear train 10. As will be understood, the magnetic means 22 and 24 interact according to their magnetic properties such that when the magnetic means 22 and 24 are in the position shown in FIG. 1, the magnetic Norths are opposite each other and therefore magnetic means 22 is repulsed by the magnetic means 24. The repulsion force between fixed magnetic means 24 and the movable magnetic means 22 applies a torque to gear 16 in the counterclockwise direction, as is also indicated by the arrow. In a similar manner, when the gear train 10 is in the position indicated in FIG. 2 of the drawing, the North Pole of fixed magnetic means 24 attracts the South Pole of the rotating magnetic means 22 thereby applying a torque to gear 16 in a counterclockwise direction, as indicated by the arrow. Thus it can be seen that in this form of the invention, where the fixed magnet is mounted with its magnetic axis in the direction of the radius of the gear 16, a constant torque is provided to the gear 16 which torque is always in the same direction, in the example shown, in the counterclockwise direction. Of course, it will be understood that were either magnetic means 22 or 24 reversed, that a clockwise torque would then be constantly applied to the gear 16. Of course, it will be obvious that, if desired, other fixed magnetic means or other rotating magnetic means may be mounted in proximity to or on the gear 16, if desired, in order to provide directional torques in any position or in all positions of the gear 16.

Referring again to FIG. 1 of the drawing, there is shown an indication of the manner of applying the control means of this invention to different gears of a gear train. In FIG. 1 an additional driving or driven gear 16' is shown in phantom lines, mounted on a shaft 18' to the right of gear 12. As will be understood, gear 16' could either be driving gear 12 or it could be driven by gear 12. Gear 16' is provided with magnetic means 22' mounted to rotate therewith in the same manner as magnetic means 22 on gear 16. Also, a fixed magnetic means 24' is mounted on housing 26, in proximity to gear 16', and interacts with magnetic means 22' to provide the desired torque to gear 16'. Thus, as will be understood, it will be clear that sufficient control means may be provided throughout the gear train to control the backlash in the gear train.

Figure 3:
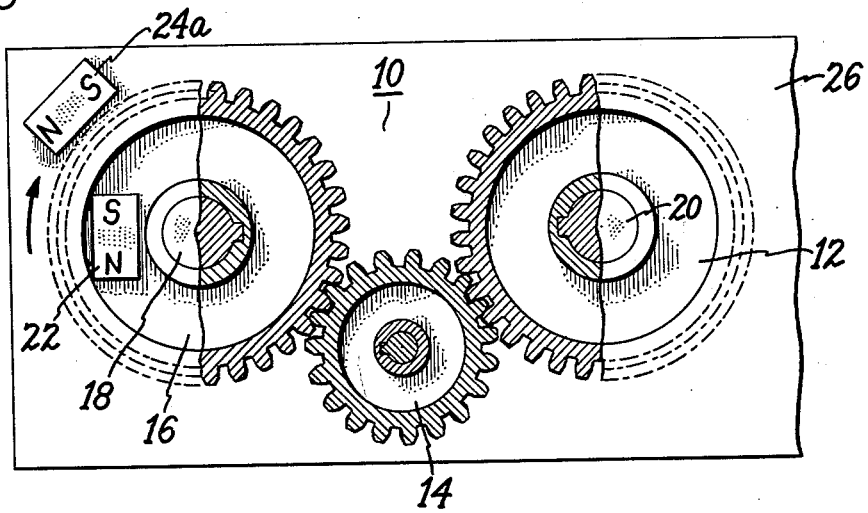
FIGURE 3 is a plan view, partly in section, of a gear train showing another form of backlash control mechanism according to this invention.
Figure 4:
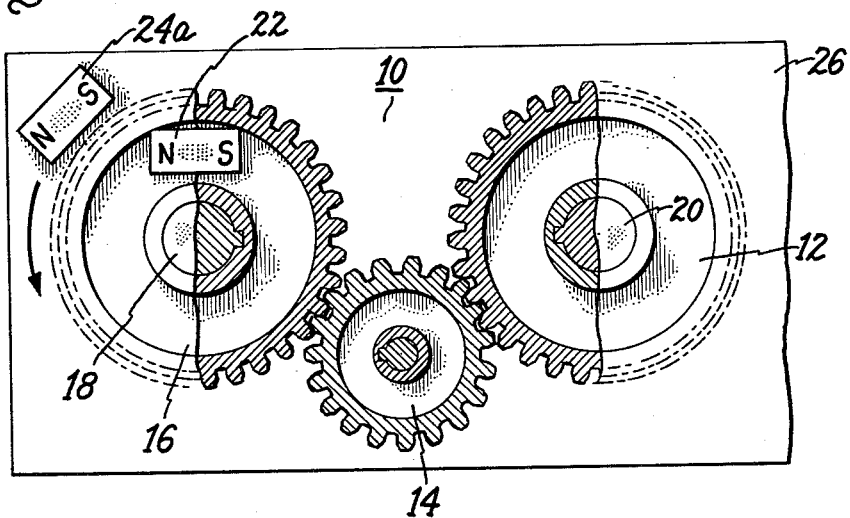
FIGURE 4 is another view of the gear train of FIG. 3 showing the gears in a second position.

Referring now to FIGS. 3 and 4 of the drawing, a second form of the invention is shown in which the magnetic means 24a is mounted with its magnetic axis tangential to gear member 16, rather than in a radial direction as in FIGS. 1 and 2. In this form of the invention it may be considered that gear train 10 is the type gear train that is first driven in one direction and is then driven in an opposite direction. In this type gear train it is desired that the torque applied to gear 16 vary direction depending upon the desired direction of driving. As can be seen in FIG. 3, with the magnetic means 22 in the position shown, the South Pole of magnetic means 22 is attracted to the North Pole of magnetic means 24a, thereby applying a clockwise torque to gear 16. In FIG. 4, where the gear 16 has been driven to a second position, the magnetic North of magnetic means 22 is now attracted to the South Pole of magnetic means 24a; thereby applying a torque in the counterclockwise direction to gear 16. Of course, as discussed in the same manner with reference to FIGS. 1 and 2, if desired, additional fixed magnets may be mounted in proximity to gear 16, or additional rotating magnets mounted on gear 16, for applying directional torques to the gear 16 when the gear 16 is in positions other than that shown in FIGS. 3 and 4.

By means of the above-described invention it will be clear to those skilled in the art that a control means or mechanism is provided which will apply a directional torque to gears within a gear train for controlling the position of a gear relative to its meshing gear to thereby control the backlash between the meshing gears. Of course, it will be obvious that the resultant torque will be utilized, as desired, to achieve any desired gear positioning within a gear train. Clearly, the control mechanism will be applied to the various gears within the gear train so as to provide the desired corrective torque throughout the entire gear train. Of course, it will be obvious that the direction and magnitude of the corrective torques can be controlled and varied according to the location and size and strength of the interacting or coacting magnets. It will also be clear that the resulting torque applied may be produced either by using attractive or repulsive forces of the coacting fixed and rotating magnets, as is desired.

From the above description it will also be obvious that the effect obtained by FIGS. 3 and 4 could be provided in FIGS. 1 and 2 by alternating the polarity of either the fixed magnetic means or the rotating magnetic means. Obviously, this could be accomplished by rotating either magnetic means or by using an electromagnetic means.

In a similar fashion, the effect accomplished by the embodiment of FIGS. 1 and 2 could also be obtained by reversing the polarity of either magnetic means in the embodiment shown in FIGS. 3 and 4. It should also be understood that the control means of this invention will find utility in various types of mating gears, as well as in various types of gear trains. For example, the gear train could be either a continuous gear train or an intermittent gear train, such as a Geneva mechanism.

While there has been shown and described the presently preferred embodiments of this invention, it will be obvious to those skilled in this art that many changes may be made in the size, shape and positioning of the magnetic means without departing from the spirit and scope of the invention, as is set forth in the appended claims.

What is claimed as new and which it is desired to secure by Letters Patent of the United States is:

1. In a gear train comprising a plurality of meshing gears mounted within a casing, a control mechanism for controlling backlash between said meshing gears comprising; a magnetic means mounted on one gear of said plurality of meshing gears, a second magnetic means fixedly positioned to said casing in proximity to said one gear, said magnetic means and said second magnetic means coacting to produce a directional torque on said one gear to maintain said one gear in operative contact with another gear of said gear train.

2. In a gear train comprising a plurality of meshing gears mounted wtihin a casing, a control mechanism for controlling backlash between said mashing gears comprising; at least two magnetic means, each mounted on a different gear of said meshing gears, at least two other magnetic means, each of said other magnetic means fixedly positioned to said casing in proximity to one said different gear, said magnetic means and said other magnetic means coacting to produce a directional torque on each said different gear to maintain each said different gear in operative contact with another gear of said gear train.

3. In a gearing device a control mechanism for controlling backlash between meshing gears comprising; a pair of meshing gears, a first magnetic means mounted on one of said gears, a second magnetic means, means fixedly positioning said second magnetic means in proximity to said one gear, said first and said second magnetic means coacting to produce a directional torque on said one gear to maintain said one gear in operative contact with the other of said gears.

4. In a gearing device a control mechanism for controlling backlash between meshing gears comprising; a pair of meshing gears, said pair of gears being mounted in a casing, a first permanent magnet mounted on one of said gears, a second permanent magnet mounted on said casing in proximity to said one gear, said first and said second permanent magnets coacting to produce a directional torque on said one gear to maintain said one gear in operative meshing contact with the other of said gears.

References Cited by the Examiner

UNITED STATES PATENTS

| 2,416,081 | 2/47 | Bakke | 235—91 |
| 2,420,607 | 5/47 | Mendelsohn | 235—91 |
| 2,510,675 | 6/50 | Baruch | 74—440 |
| 2,893,257 | 7/59 | Schulte | 74—409 |

FOREIGN PATENTS 591,285   8/47   Great Britain.

DON A. WAITE, *Primary Examiner.*